April 12, 1960     F. J. KAEHNI     2,932,780
DIRECT CURRENT VOLTAGE TRANSFORMER Filed Sept. 24, 1954     3 Sheets-Sheet 1

INVENTOR.
Frank J. Kaehni

BY *Webb, Mackey & Burden*

HIS ATTORNEYS

INVENTOR.
Frank J. Kaehni

HIS ATTORNEYS

April 12, 1960  F. J. KAEHNI  2,932,780
DIRECT CURRENT VOLTAGE TRANSFORMER
Filed Sept. 24, 1954  3 Sheets-Sheet 3

INVENTOR.
Frank J. Kaehni
BY
HIS ATTORNEYS

United States Patent Office 2,932,780
Patented Apr. 12, 1960

2,932,780

DIRECT CURRENT VOLTAGE TRANSFORMER

Frank J. Kaehni, Cleveland, Ohio, assignor to The Electric Heat Control Company, Youngstown, Ohio, a corporation of Ohio Application September 24, 1954, Serial No. 458,219

22 Claims. (Cl. 321—2)

The present invention relates to apparatus for supplying a high voltage direct current for any desired purpose. More particularly, it relates to a simplified apparatus for transforming low voltage direct current to high voltage direct current without the use of the usual transformer having primary and secondary windings and a core.

The present application is a continuation-in-part of my copending application, Serial No. 340,214, filed March 4, 1953, now abandoned.

Heretofore, in order to obtain a high voltage direct current from a low voltage direct current source, such as a battery, it has been necessary to use a motor generator, a dyna-motor, or a vibrator power supply system. This last mentioned system has been used generally because of its simplicity of structure and low cost as compared with the other systems mentioned. It has been used generally in portable radio receiving and sending sets, including those used in automobiles, airplanes and other vehicles. Such a vibrator power supply system consists essentially of a vibrator unit or current interruptor, a step-up transformer, and rectifying, filtering and shielding means, whereby the low voltage direct current is transformed to alternating current, stepped up to a high voltage alternating current, rectified back to direct current and smoothed out and filtered before application to the high voltage direct current circuit of the device requiring it, such as the screens and plates of the tubes of a radio receiving set.

One of the objects of the present invention is to simplify the apparatus required to obtain a high voltage direct current from a low voltage direct current source and to provide inexpensive, compact, durable and efficient apparatus for this purpose which can be used for various types of apparatus requiring a high voltage direct current, including radio receiving sets, hearing aids, audio amplifiers and various electronic units.

In accordance with my invention, I provide apparatus which will deliver a suitable high voltage direct current from a low voltage direct current source without the use of a transformer in the circuit. I have found that the usual transformer can be eliminated and a vibrator in combination with other elements used to perform the functions normally performed by the vibrator and the transformer. Thus, the apparatus required is simplified and the cost and weight of the equipment reduced materially.

In accordance with my invention, I have found that the inductive effect of the coil which operates the vibrating reed contacts of the vibrator is sufficient to obtain high potential impulses which, when rectified and filtered, produce the same effect that the step-up transformer, with its iron core and primary and secondary windings, accomplishes in the devices now known and used.

The degree of voltage step-up obtainable is dependent upon the ratio of inductance to resistance and distributed capacity in the vibrator coil winding. I have found that a conventional vibrator, when employed in a circuit embodying my invention, will deliver as much as several hundred volts direct current potential at low current drain from batteries of 1½ to 6 volts. This high voltage is obtained at the instant of the opening of the contacts and can be rectified conveniently by means of a small selenium rectifier or some other similar unilateral conductivity circuit element. When the contacts of the vibrator come together again, the reverse voltage is very small due to the larger time element involved in the building up of magnetic flux in the core of the coil. This is a desirable condition because the peak inverse voltage on the rectifier elements is low, resulting in extremely long life for the rectifier element used in my new combination. The rectifier also prevents the stored energy in the high voltage condenser used from discharging through the interruptor and coil when the contacts close.

It will be apparent to those skilled in the art to which my invention appertains that the new combination which I provide consists essentially of a source of low potential direct current, a vibrator unit having an induction coil and core and a vibrating contact, a rectifier, a condenser in the high voltage direct current system and other filtering units. A radio frequency shield is also preferably employed in my novel unit.

In the accompanying drawings, I have shown, for illustrative purposes only, several circuits embodying my invention. In the drawings, Figure 1 shows a transformer circuit for transforming low voltage direct current to high voltage direct current suitable for portable radios and various other types of equipment;

Figure 1:
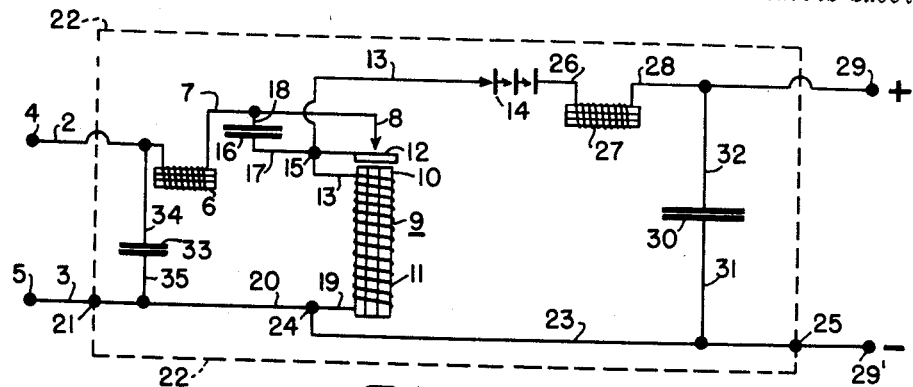

Referring first to Figure 1, the leads 2 and 3 are connected to the contacts 4 and 5 of the source of low voltage direct current. The lead 2 is connected to a choke coil 6, the other end of which is connected by a conductor 7 to a stationary contact 8 of the vibrator unit indicated generally by the reference character 9. The vibrator consists of a core 10, an induction coil 11, a stationary contact 8, and a vibrating contact 12 which moves between the contact 8 and the one end of the core 10. A conductor 13 extends from one end of the induction coil and is connected to one side of the rectifier 14. The lead 13 is connected to the contactor 12 at the contact marked 15 and between this contact and the lead 7 there is interposed a filtering condenser 16. The conductor 17 extends between the contact 15 and the condenser 16 and the conductor 18 connects the other side of the condenser to the conductor 7.

The other end of the induction coil is connected by leads 19 and 20 to a contact 21 to which the lead 3 from the one side of the source of low voltage direct current is connected. At this point, contact is also made with the filtering shield 22, which encloses the unit except for the source of low voltage direct current which, in this instance, is located outside the shield. A conductor 23 is connected with the conductors 19 and 20 at the contact point 24 and this conductor 23 is connected to the negative side 29' of the high voltage direct current outlet. The lead 23 is connected at contact 25 to the shield 22.

As stated above, one side of the induction coil is connected to one side of the rectifier 14. The other side of the rectifier is connected by a conductor 26 to a choke coil 27 and the other side of the choke coil is connected by a lead 28 to the positive contact 29 of the high voltage direct current outlet. A filtering condenser 30 is connected by leads 31 and 32, respectively, to the conductors 23 and 28, which, as stated, lead to the negative and positive contacts of the high voltage direct current outlet.

In addition to the condensers described, a filtering condenser 33 is connected across the low voltage direct current inlet leads 2 and 20 by conductors 34 and 35.

In addition to its filtering function, the condenser 16 also eliminates sparking of the vibrator contact points and, by doing so, prolongs the life thereof. However, in some types of small power units, this condenser 16 may be dispensed with without adversely affecting the efficiency of the operation.

In the event that a negative high voltage is desirable, as in some of the transistor types of electronic circuits, the polarity of the rectifier 14 may be reversed, thus providing negative voltages with the positive side of the high voltage supply grounded. Where a ground is required at a potential somewhere between the positive and negative voltages of the output, the connection indicated at 25 can be eliminated and a ground connection made at some intermediate terminal on a voltage divider resistor positioned in the high voltage circuit, as will be readily appreciated by those skilled in the art.

The rectifier 14, as well as the rectifiers 72 and 74 in the embodiment of Figure 3, which is discussed hereinafter, may also be replaced with a non-linear resistance element, such as "Thyrite." Also, in some cases, it may be replaced by a synchronous contactor mounted on the moving part of the vibrating contact spring. However, where this is done, accurate adjustment of the contacts is required, and, for this reason, the embodiments shown in the drawings are preferable.

Also, as will be apparent to those skilled in this art, depending upon the polarity of the low voltage source and its method of connection into the circuit, its voltage can be added to or subtracted from the high voltage obtained by this tranformation method.

Thus it will be seen that, by my invention, I have provided a simple, compact unit which can be utilized for changing low voltage direct current to a high voltage direct current.

Figure 2:
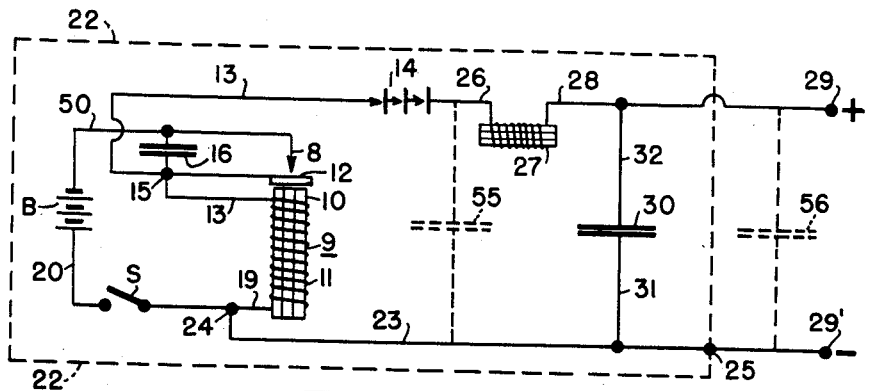
Figure 2 shows a somewhat similar circuit in which the source of low potential direct current is within the metallic shield and in which the parts are arranged so as to permit elimination of certain of the choke coils and filtering condensers.

In Figure 2, I have illustrated a further embodiment of my invention in which the source of low voltage direct current is positioned within the metal filtering shield 22. This permits further simplification of units embodying my invention. In this embodiment, the choke coil 6 of Figure 1 and the filtering condenser 33 have been eliminated. In the embodiment shown in Figure 1, these are used to prevent radio noise generated at the vibrator contact points from getting into the battery circuit and thus re-radiating noise to the radio receiver, but, in the embodiment shown in Figure 2, these parts can be eliminated because the battery cell itself is enclosed within the metal radio frequency shield. In the embodiment shown in Figure 2, the battery B is the source of low voltage direct current. The one side of this battery is connected by a lead conductor 50 to the contact 8 of the vibrator unit 9. As in the embodiment shown in Figure 1, the vibrator unit comprises a core 10, the coil 11, the contact 8 and the vibrating element 12. One end of the induction coil is connected by a conductor 13 to the rectifier 14. A contact 15 is provided in the conductor 13 and a filtering condenser 16 is connected between the conductor 13 and the conductor 50 leading from the battery to the contact 8. The vibrator element 12 is also connected to the contact 15 as in the embodiment shown in Figure 1. The other side of the induction coil is connected by a lead 19 to a contact 24 and by a conductor 20 to the other side of the battery. A switch S may be included in this circuit. A conductor 23 is connected to the contact 24 and is also connected to the contact terminal 29' which is the negative side of the high voltage outlet. The conductor 23 is joined to the shield 22 at the contact point 25, as in the embodiment shown in Figure 1.

The one side of the rectifier 14 is connected by a conductor 26 to a choke coil 27, the other side of which is connected by a conductor 28 to the positive contact 29 of the high voltage direct current outlet. A condenser 30 is connected by leads 31 and 32 across the lines 23 and 28, as in the embodiment shown in Figure 1, and additional capacitances 55 and 56 indicated in dotted lines in Figure 2 may be used if desired.

Figure 3:
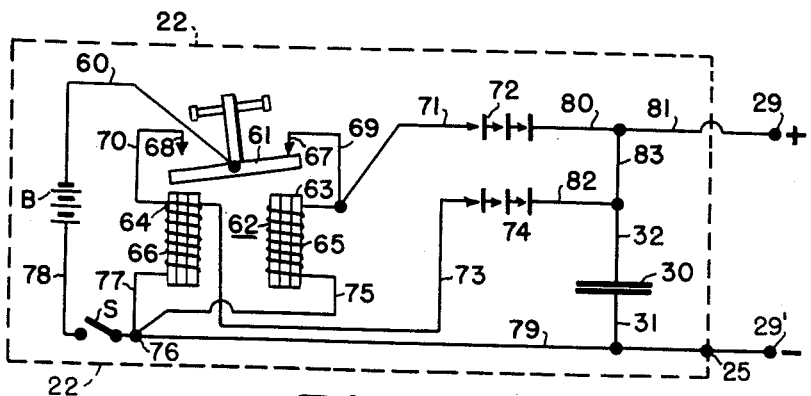
Figure 3 shows a further circuit embodying a pivoted contactor element and two induction coils.

In the embodiment shown in Figure 3, the battery B is the source of low potential direct current and is positioned within the shield 22 as in the embodiment shown in Figure 2. In this embodiment, the one side of the battery is connected by a lead 60 to the pivoted contactor 61 of a two-coil vibrator unit indicated generally by the reference character 62. This vibrator unit contains two cores 63 and 64 and two induction coils 65 and 66. The cores and coils are positioned to cooperate with the pivoted vibrating contactor 61. The one arm of the contactor 61 moves between the core 63 and a fixed contact element 67 and the other end of this vibrating contactor 61 moves between the core 64 and an oppositely disposed contact element 68. The contact element 67 is connected by a lead 69 to the coil 65 and the contact 68 is connected by a conductor 70 with the coil 66. This same end of the coil 65 is connected by a lead 71 to a rectifier 72. The one end of the coil 66 is likewise connected by a conductor 73 to a rectifier 74. The other side of coil 65 is connected by a lead 75 to the contact point 76 and the other side of coil 66 is likewise connected to this contact by a conductor 77. This contact 76 is connected by a conductor 78 to the other side of the battery and a switch S is interposed in this line if desired. The contact 76 is connected by a lead 79 to the negative side 29' of the high potential outlet. A connection is made between the lead 79 and the shield 22 at the contact point 25.

The outlet side of the rectifier 72 is connected by leads 80 and 81 to the positive side 29 of the high potential outlet. The outlet side of the rectifier 74 is connected by leads 82, 83 and 81 to the outlet contact 29. A condenser 30 is connected by leads 31 and 32 across the positive and negative outlet leads, as in the case of the other two embodiments described.

The vibrating contactor element 61 need not be specifically described herein as it is of the usual conventional type well known to those skilled in the art.

It will be apparent to those skilled in the art that, if the condenser 30 in the high voltage circuit in each of the above described embodiments is made larger or if the equivalent of its filtering effect is supplied outside the unit, various modifications in the arrangement and number of choke coils and condensers can be made. Also, the polarity of the low voltage circuit (contacts 4 and 5 of Figure 1 and battery B in Figures 2 and 3) and of the windings 11, 65 and 66 must be selected so that the inductive impulses at the rectifier, when the vibrator contacts are open, are of the correct polarity to provide the proper polarity in the high voltage circuit.

Figure 4:
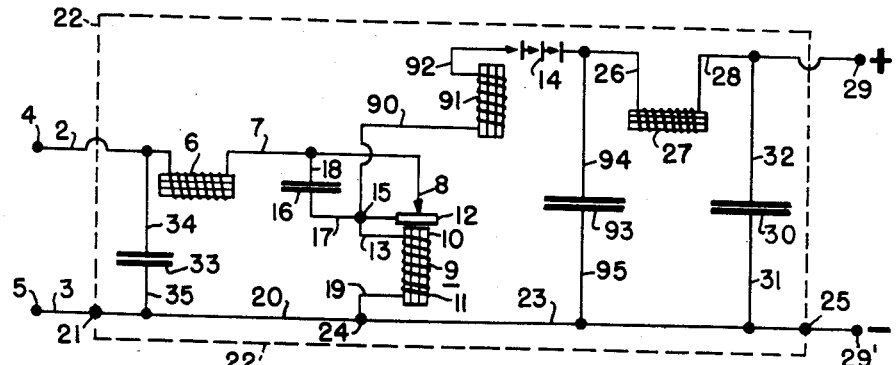
Figure 4 shows a further embodiment of my invention utilizing additional capacitance and a double coil.

Referring next to the embodiment shown in Figure 4, it will be seen that a double coil arrangement is provided instead of the single coil arrangement of Figure 1. This embodiment is desirable where higher voltages are desired. In this embodiment, a second induction coil 91 is provided in conjunction with the vibrator unit. This coil may be on the same core as the coil 11 or it may be on a separate core. As shown in this embodiment, one end of a lead 90 is connected to the contact point 15 and the other end thereof is connected to the coil 91. The other end of this coil is connected to one side of the rectifier 14 which, as stated in connection with the embodiment of Figure 1, is connected by a lead 26 to a choke coil 27. In this embodiment, an additional capacitance 93 is provided. This capacitance is connected by a lead 94 to the lead 26 which connects the rectifier to the choke coil and the other side of the capacitance 93 is connected by a lead 95 to the lead 23 which connects to the negative side of the high voltage direct current outlet.

Figure 5:
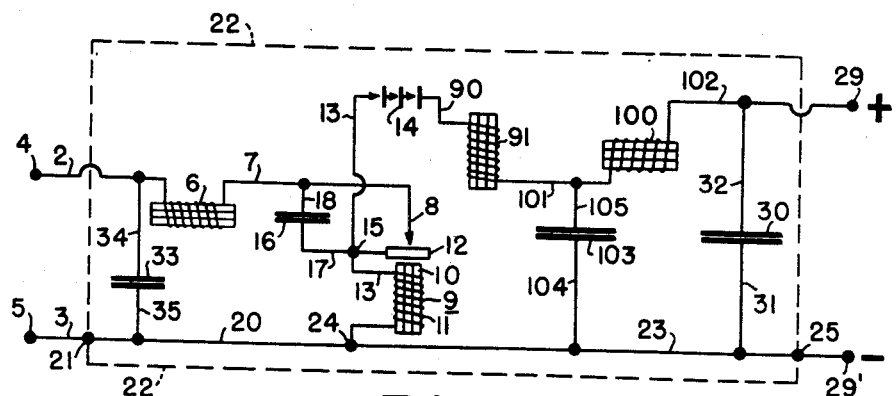
Figure 5 shows a further embodiment of my invention, somewhat similar to that shown in Figure 4, except with certain of the parts relocated in the circuits.

The embodiment shown in Figure 5 is similar to that shown in Figure 4. However, in this embodiment, the rectifier 14 is positioned somewhat differently in the circuit. In this embodiment, one side of the rectifier 14 is connected by a lead 13 to the contact point 15 and the other side is connected by a lead 90 to the additional coil 91. This coil 91, as stated above, in connection with Figure 4, may or may not be on the same core as the coil 11 of the vibrator unit. The other side of the coil 91 is connected by a lead 101 to the choke coil 100, the other side of which is connected by a lead 102 to the positive side 29 of the high voltage outlet. A capacitance 103 is positioned in the circuit between the coil 91 and the choke coil 100. One side of the capacitance is connected by a lead 105 to the lead 101 and the other side is connected by a lead 104 to the lead 23, which, as stated above, is connected to the negative side 29' of the high voltage outlet.

Figure 6:
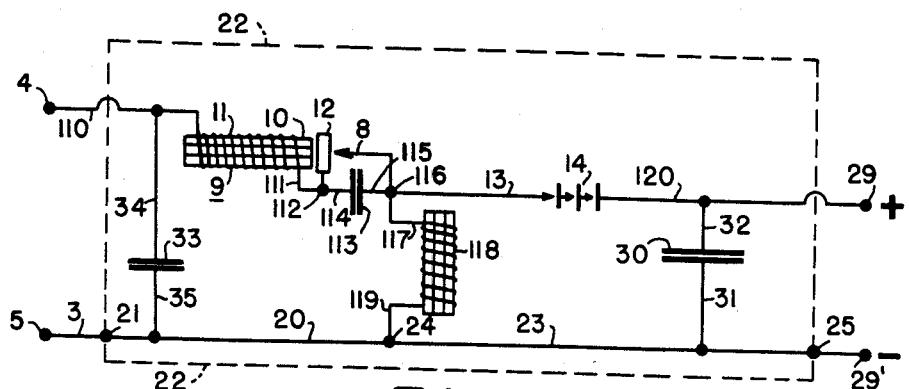
Figure 6 shows a further embodiment of my invention in which a radio frequency choke coil is utilized for actuating the vibrator.

In the embodiment shown in Figure 6, the actuating coil of the vibrator unit functions also as a radio frequency choke coil. In this embodiment, the contact 4 for the source of low voltage direct current is connected by a lead 110 to the coil 11 of the vibrator unit. The other end of the coil is connected by a lead 111 to the contact point 112. This contact point is connected to the vibrator element 12 and is also connected to a condenser 113 by a lead 114. The other side of the condenser is connected by a lead 115 to a contact point 116 which is connected to the stationary contact 8 and which is also connected by a lead 117 to one end of a coil 118. The other end of this coil is connected by a lead 119 to the contact point 24. In this embodiment, one side of the rectifier 14 is connected by a lead 13 to the contact point 116 and the other side is connected by a lead 120 to the positive side 29 of the high voltage outlet. The capacitance 39, in this embodiment, is connected across from the lead 120 to the lead 23 which is connected to the negative side 29' of the high voltage outlet.

Figure 7:
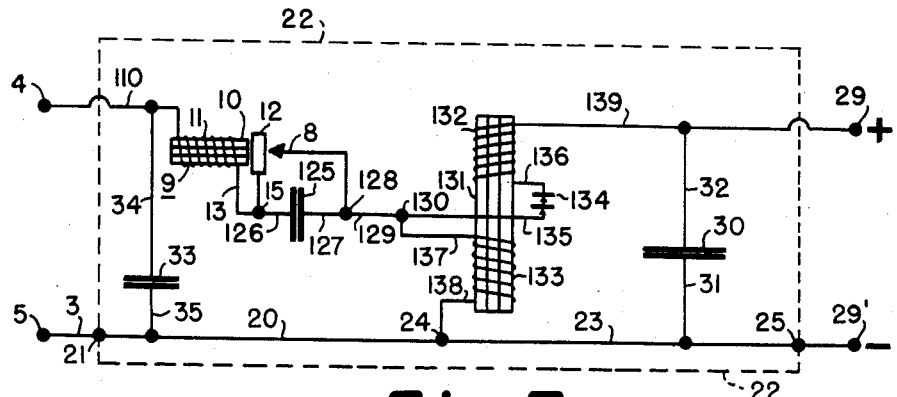
Figures 7 and 8 show further embodiments of my invention, somewhat similar to Figure 6, but utilizing a core with a double winding thereon instead of the choke coil shown in Figure 6.

In Figure 7, a somewhat different embodiment is illustrated. In this embodiment, the stationary contact of the vibrator unit is connected to a contact point 128. A capacitance 125 is positioned between the contact point 128 and the contact point 15, one side of the capacitance being connected to the contact point 15 by a lead 126 and the other side being connected by a lead 127 to the contact point 128. A lead 129 connects the contact point 128 and the contact point 130. A core 131 is provided which has thereon two windings 132 and 133. A rectifier 134 is positioned between the coils. One side of the rectifier is connected through a lead 136 to the coil 132 and the other side of the rectifier is connected to the contact point 130 by a lead 135. One side of the coil 133 is likewise connected to the contact point 130 by a lead 137. The other end of this coil is connected by a lead 138 to the contact point 24. Referring again to the coil 132, one end of which is connected by the lead 136 to the rectifier 134, the other end thereof is connected by the lead 139 to the positive side 29 of the high voltage outlet.

Figure 8:
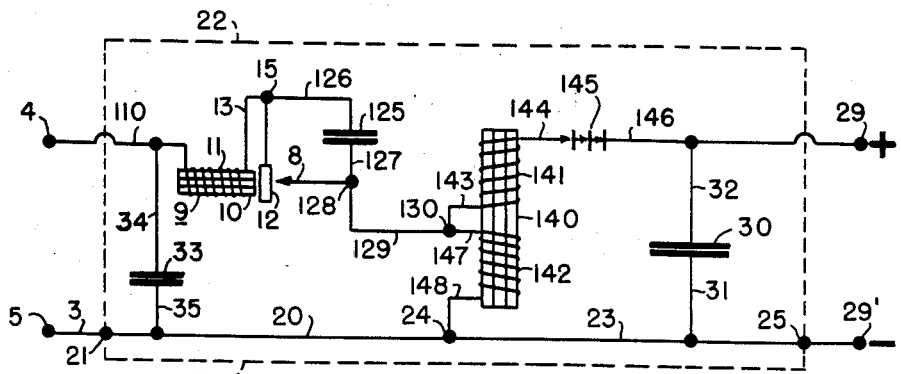

In Figure 8, I have shown an embodiment somewhat similar to that shown in Figure 7. In this embodiment, however, the rectifier and coils are arranged somewhat differently. In this embodiment, a core 140 is provided having coils 141 and 142 wound thereon. The one end of the coil 141 is connected by a lead 143 to the contact point 130. The other end of said coil is connected by a lead 144 to one side of a rectifier 145. The other side of said rectifier 145 is connected by a lead 146 to the positive side 29 of the high voltage outlet. One side of the coil 142 is connected by a lead 147 to the contact point 130 and the other side of said coil is connected by a lead 148 to the contact point 24, which, as stated above, is connected by a lead 23 to the negative side 29' of the high voltage outlet.

It will be apparent to those skilled in the art that the present invention provides a simple, compact unit for transforming a low potential direct current to a high potential direct current and that various modifications can be made in the apparatus described above within the scope of my invention, as defined in the appended claims.

I claim:

1. A D.C. pulsation generator for supplying a high voltage load comprising a storage capacitance for storing the high voltage supplied, a source of supply of low voltage, a vibrator having its inductance coil providing at one end a connection common to said capacitance and to said supply, normally closed contacts of the vibrator providing an inductance charging path from said supply when the latter is connected thereto, and a rectifier providing an inductance discharge path to the storage capacitance when said closed contacts are opened but interposed in series between the latter and said capacitance to cut off current flow in the latter said path of the inductance as said inductance becomes discharged.

2. A D.C. pulsation generator for supplying a high voltage load comprising a storage capacitance for storing the high voltage supplied, a source of supply of low voltage, an inductance coil providing at one end thereof a connection common to said capacitance and to said supply, means including normally closed contacts providing an inductance charging path from said supply when the latter is connected thereto, and a rectifier providing an inductance discharge path to the storage capacitance when said closed contacts are opened but interposed in series between the latter and said capacitance to cut off current flow in the latter said path of the inductance as said inductance becomes discharged.

3. In apparatus of the character described, the combination of a source of low voltage direct current, a two-coil vibrator unit, a pair of rectifiers individual to the coils within the vibrator unit, an electrical connection leading from each side of said source to said vibrator unit, a conductor leading from said vibrator unit and one side of said source and forming a high voltage outlet lead, and a second high voltage lead, said rectifiers providing separate paths electrically connected between the individual coils of said vibrator unit and said second high voltage outlet lead.

4. In apparatus of the character described, the combination of a source of low voltage direct current, a vibrator unit comprising at least one induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge, and high voltage outlet leads, one of which is electrically connected with the rectifier and the other of which is connected to said circuit completing means connected at said other end of the induction coil means and at the said other side of said source.

5. In apparatus of the character described, the combination of a source of low voltage direct current, a vibrator unit comprising at least one induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge, high voltage outlet leads, one of which is electrically connected with the rectifier and the other of which is connected to said circuit completing means connected at said other end of the induction coil means and at the said other side of said source, a shield surrounding the vibrator unit and rectifier, and at least one capacitance connected between said high voltage outlet leads.

6. In apparatus of the character described, the combination of a source of low voltage direct current, a vibrator unit comprising at least one induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge, high voltage outlet leads, one of which is electrically connected with the rectifier and the other of which is connected to said circuit completing means at said other end of the induction coil means and at the said other side of said source, a shield surrounding the vibrator unit and rectifier, and a capacitance in the vibrator circuit.

7. In apparatus of the character described, the combination of a source of low voltage direct current, a vibrator unit comprising induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge to the adjacent side of the rectifier, a high voltage outlet lead connected to the other side of said rectifier and a high voltage outlet lead connected to the side of the induction coil connected to the source of low voltage direct current, and a capacitance connected across said high voltage outlets.

8. In apparatus of the character described, the combination of a source of low voltage direct current, a vibrator unit comprising induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge to the adjacent side of the rectifier, a conductor connected to the other side of the rectifier and comprising one of the high voltage outlet leads, a second high voltage outlet lead electrically connected with the side of the source connected with said induction coil, and a capacitance electrically connected between the side of the induction coil connected to the rectifier and the side of said source connected to the contact of the vibrator unit.

9. In apparatus of the character described, the combination of a source of low voltage direct current, a vibrator unit comprising induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge to the adjacent side of the rectifier, a conductor connected to the other side of the rectifier and comprising one of the high voltage outlet leads, a second high voltage outlet lead electrically connected with the side of the source connected with said induction coil, and a capacitance connected across the connections leading from the said source of low voltage direct current to the vibrator unit.

10. In apparatus of the character described, the combination of a source of low voltage direct current, a vibrator unit comprising induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge to the adjacent side of the rectifier, a conductor connected to the other side of the rectifier and comprising one of the high voltage outlet leads, a second high voltage outlet lead electrically connected with the side of the source connected with said induction coil, and a metallic shield enclosing said vibrator unit and rectifier, said metallic shield being electrically connected with said second high voltage outlet lead.

11. In apparatus of the character described, the combination of a source of low voltage direct current, a vibrator unit comprising induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge to the adjacent side of the rectifier, a conductor connected to the other side of the rectifier and comprising one of the high voltage outlet leads, a second high voltage outlet lead electrically connected with the side of the source connected with said induction coil, a capacitance connected across said high voltage outlet leads, and a metallic shield enclosing said source, said vibrator unit, said rectifier and said capacitance.

12. In apparatus of the character described, the combination of a source of low voltage direct current, a vibrator unit comprising induction coil means, normally closed contacts of said vibrator unit establishing a circuit connection between one end of said induction coil means and said source, said induction coil means having means at its other end completing the circuit connecting same to the other side of said source, means including a rectifier providing an inductance discharge path each time said closed contacts are repetitively opened by means of said induction coil means in the vibrator unit but operative to cut off reverse current flow in the inductance discharge path when said induction coil means completes each successive discharge to the adjacent side of the rectifier, a conductor connected to the other side of the rectifier and comprising one of the high voltage outlet leads, a second high voltage outlet lead electrically connected with the side of the source connected with said induction coil, a capacitance connected across the connections leading from the said source of low voltage direct current to the vibrator unit and a metallic shield housing the said capacitance, vibrator unit and rectifier.

13. In apparatus of the character decribed, the combination of a source of low voltage direct current, a vibrator unit including an induction coil, a fixed contact, and a movable contact adapted to engage said fixed contact, said movable contact carrying a magnetizable portion adapted to be acted upon by said induction coil so that said movable contact vibrates between said fixed contact and said coil, a rectifier, an electrical connection between one of said contacts and one side of said source, an electrical connection between one side of the coil and the other side of said source, an electrical connection between the other side of said coil and one side of the rectifier, an electrical connection between the other side of said coil and the other of said contacts, a conductor connected to the other side of the rectifier and comprising one of the high voltage outlet leads, and a second high voltage outlet lead electrically connected with the side of the source connected with said induction coil.

14. In apparatus of the character described, the combination of a source of low voltage direct current, a vibrator unit including an induction coil, a fixed contact, and a movable contact adapted to engage said fixed contact, said movable contact carrying a magnetizable portion adapted to be acted upon by said induction coil so that said movable contact vibrates between said fixed contact and said coil, a rectifier, an electrical connection between one of said contacts and one side of said source, an electrical connection between one side of the coil and the other side of said source, an electrical connection between the other side of said coil and one side of the rectifier, an electrical connection between the other side of said coil and the other of said contacts, a conductor connected to the other side of the rectifier and comprising one of the high voltage outlet leads, a second high voltage outlet lead electrically connected with the side of the source connected with said induction coil, and a capacitance connected across said high voltage outlet leads.

15. In apparatus of the character described, the combination of a source of low voltage direct current, a vibrator unit including an induction coil, a fixed contact, and a movable contact adapted to engage said fixed contact, said movable contact carrying a magnetizable portion adapted to be acted upon by said induction coil so that said movable contact vibrates between said fixed contact and said coil, a rectifier, an electrical connection between one of said contacts and one side of said source, an electrical connection between one side of the coil and the other side of said source, an electrical connection between the other side of said coil and one side of the rectifier, an electrical connection between the other side of said coil and the other of said contacts, a conductor connected to the other side of the rectifier and comprising one of the high voltage outlet leads, a second high voltage outlet lead electrically connected with the side of the source connected with said induction coil and a metallic shield enclosing at least said vibrator unit and rectifier.

16. In apparatus of the character described, the combination of a source of low voltage direct current, a vibrator including a contact-operating induction coil, first and second engageable contacts one of which is fixed and the other being movable and adapted to engage said fixed contact, said movable contact carrying a magnetizable portion adapted to be acted upon by said induction coil so that said movable contact vibrates between said fixed contact and said induction coil, an electrical connection between said first contact and one side of said source, an electrical connection between one side of said coil and the other side of said source, unilaterally conductive outlet lead means connected to the other side of said coil comprising a rectifier poled to conduct high voltage from said coil and forming a high voltage outlet lead, an electrical connection between the other side of said coil and said second contact, another high voltage outlet lead electrically connected to one of the sides of said source, and a capacitance electrically connected between the side of the induction coil connected to the rectifier and the side of said source connected as aforesaid to the first contact.

17. In apparatus of the character described, the combination of a source of low voltage direct current, a vibrator unit including an induction coil, a fixed contact, and a movable contact adapted to engage said fixed contact, said movable contact carrying a magnetizable portion adapted to be acted upon by said induction coil so that said movable contact vibrates between said fixed contact and said coil, a rectifier, an electrical connection between one of said contacts and one side of said source, an electrical connection between one side of the coil and the other side of said source, an electrical connection between the other side of said coil and one side of the rectifier, an electrical connection between the other side of said coil and the other of said contacts, a conductor connected to the other side of the rectifier and comprising one of the high voltage outlet leads, a second high voltage outlet lead electrically connected with the side of the source connected with said induction coil, a capacitance connected across the connections leading from said source of low voltage direct current to the vibrator unit, and a choke coil in the line from said source to said contact.

18. In apparatus of the character described, the combination of a source of low voltage direct current, a vibrator unit including an induction coil, a fixed contact, and a movable contact adapted to engage said fixed contact, said movable contact carrying a magnetizable portion adapted to be acted upon by said induction coil so that said movable contact vibrates between said fixed contact and said coil, a rectifier, an electrical connection between one of said contacts and one side of said source, an electrical connection between one side of the coil and the other side of said source, an electrical connection between the other side of said coil and one side of the rectifier, an electrical connection between the other side of said coil and the other of said contacts, a conductor connected to the other side of the rectifier and comprising one of the high voltage outlet leads, a second high voltage outlet lead electrically connected with the side of the source connected with said induction coil, a capacitance connected across said high voltage outlet leads, a second capacitance connected across the connections leading from the said source of low voltage direct current to the vibrator unit, a choke coil in the line from said source to said contact, a third capacitance electrically connected between the side of the induction coil connected to the rectifier and the side of said source connected to the contact of the vibrator unit and a metallic shield housing at least the vibrator unit and rectifier.

19. In apparatus of the character described, the combination of a source of low voltage direct current, a vibrator unit comprising a plurality of induction coils, normally closed contacts being provided in said vibrator unit for each of said induction coils, the normally closed contacts of said vibrator unit establishing a circuit connection between one end of each of said induction coils and said source at differing times, said induction coils having means at the other end completing the circuit connecting same to the other side of said source, means including a rectifier providing an inductance discharge path each time the closed contacts for each induction coil are repetitively opened by means of that induction coil in the vibrator unit but operative to cut off reverse current flow in the inductance discharge path when said induction coil completes each successive discharge, and high voltage outlet leads, one of which is electrically connected to the rectifier and the other of which is connected to said circuit completing means at the other end aforesaid of the induction coils and at said other side of said source.

20. In apparatus of the character described, the combination of a source of low voltage direct current, a two-coil vibratory unit having a coil operated vibrating contactor normally alternately in engagement with each one of a pair of oppositely disposed fixed contact elements, an electrical connection leading from one side of said source to said vibrating contactor, means comprising a conductor leading from said vibratory unit and the other side of said source and forming a high voltage outlet lead, a second high voltage outlet lead, said vibratory unit and said second high voltage outlet lead being provided with rectifiers therebetween forming separate permanent connections between each of said fixed contact elements and said second high voltage outlet lead, and a capacitance connected across said high voltage outlet leads.

21. Apparatus of the character described, comprising a source of low voltage direct current and a vibrator unit including a two-terminal coil, said source and said vibrator unit being provided with electrical connections therebetween for interruptably connecting said coil terminals simultaneously directly to different sides of said source, a series combination of a first rectifier and a capacitance connected across the terminals of said coil, a similar two-terminal coil included in said vibrator unit and likewise interruptably connected with its terminals to the different sides of said source, a series combination of a second rectifier and said capacitance connected across the terminals of the last-named coil so that said capacitance is common to the two series combinations, said two coils having a conductor common to one terminal of each and to one side of their common capacitance in said series combinations and forming a first high voltage outlet lead, a second high voltage outlet lead connected to the other side of said common capacitance and leading in common from said rectifiers, and a metallic shield housing at least the vibrator unit and said first and second rectifiers.

22. In apparatus of the character described and in combination with a source of low voltage direct current, means comprising a two-terminal coil vibrator, an electrical connection leading from each side of said source to said vibrator, a conductor leading from said vibrator and one side of said source and forming a high-voltage outlet lead, a second high-voltage outlet lead, and a rectifier operative between said vibrator and said second high-voltage outlet lead, said rectifier being connected by a direct metallic connection to one of said two coil terminals of said vibrator and poled to conduct voltage of one sign from the latter to said second high-voltage outlet lead, and said conductor being connected by a direct metallic connection to the other of said two coil terminals of the vibrator whereby voltage of the opposite sign is impressed on the first named high-voltage outlet lead.

References Cited in the file of this patent

UNITED STATES PATENTS

| | | |
|---|---|---|
| 1,741,017 | Feild et al. | Dec. 24, 1929 |
| 1,951,614 | Kaehni et al. | Mar. 20, 1934 |
| 2,176,447 | Vilkomerson | Oct. 17, 1939 |
| 2,306,002 | Sullivan et al. | Dec. 22, 1942 |
| 2,489,656 | Mas | Nov. 29, 1949 |
| 2,527,092 | Orvedahl | Oct. 24, 1950 |
| 2,718,601 | Oliwa | Sept. 20, 1955 |
| 2,747,092 | Bostwick | May 22, 1956 |
| 2,761,075 | Mas | Aug. 28, 1956 |
| 2,817,803 | Aileman | Dec. 24, 1957 |